US006752247B2

(12) United States Patent
Hartsock

(10) Patent No.: US 6,752,247 B2
(45) Date of Patent: Jun. 22, 2004

(54) METHOD AND AN ASSEMBLY FOR BRAKING A SELECTIVELY MOVEABLE ASSEMBLY HAVING A CONTROLLABLY VARYING AMOUNT OF SELF ENERGIZATION

(75) Inventor: Dale Lee Hartsock, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 2 days.

(21) Appl. No.: 10/063,635

(22) Filed: May 6, 2002

(65) Prior Publication Data

US 2003/0205438 A1 Nov. 6, 2003

(51) Int. Cl.$^7$ ............................................. F16D 55/08
(52) U.S. Cl. .................... 188/72.7; 188/72.2; 188/708; 188/368; 188/156; 188/162
(58) Field of Search ................ 188/72.7, 72.2, 188/70 B, 368, 366, 156, 162, 157; 303/20, 112

(56) References Cited

U.S. PATENT DOCUMENTS

| | | | | |
|---|---|---|---|---|
| 3,662,864 A | * | 5/1972 | Evans ........................ | 188/72.2 |
| 4,784,244 A | * | 11/1988 | Carre et al. .................. | 188/156 |
| 4,809,823 A | * | 3/1989 | Fargier ....................... | 188/72.7 |
| 4,852,699 A | * | 8/1989 | Karnopp et al. ........... | 188/72.2 |
| 6,318,513 B1 | * | 11/2001 | Dietrich et al. ............ | 188/72.7 |

FOREIGN PATENT DOCUMENTS

| | | |
|---|---|---|
| EP | 0 953 785 A3 | 4/1999 |
| GB | 219157 | 7/1924 |
| GB | 832044 | 4/1960 |
| GB | 2195157 | 3/1988 |
| WO | 02/10609 A1 | 2/2002 |
| WO | 02/095257 A2 | 11/2002 |
| WO | 03/036121 A1 | 5/2003 |

OTHER PUBLICATIONS

Search Report for Application No. GB 0309697.1, Nov. 14, 2003.

* cited by examiner

Primary Examiner—Matthew C. Graham
Assistant Examiner—Benjamin A. Pezzlo
(74) Attorney, Agent, or Firm—Gary Smith; Brooks Kushman P.C.

(57) ABSTRACT

An electromechanical brake assembly 10 having a pair of selectively movable and dissimilar self energization wedge members 24, 26 which are respectively and independently controlled by motors 30, 34, and which have respectively dissimilar angles of inclination 60, 62, thereby providing a controllably varying amount of self energization.

14 Claims, 2 Drawing Sheets

METHOD AND AN ASSEMBLY FOR BRAKING A SELECTIVELY MOVEABLE ASSEMBLY HAVING A CONTROLLABLY VARYING AMOUNT OF SELF ENERGIZATION

BACKGROUND OF INVENTION

An electromechanical braking assembly typically provides braking of a selectively movable assembly (such as a vehicle) by the use of a motor which becomes selectively energized upon a sensed depression of a brake member. At the outset, it should be appreciated that the term selectively movable assembly refers to any assembly, including but not limited to a vehicle, which has at least one wheel which may be selectively rotated and which must be selectively braked. Hence, it should be realized that the present invention is applicable to a wide variety of such selectively movable assemblies and is not limited only to a vehicle. Further, while the terms vehicle and selectively movable assembly may be interchangeably used in this description, the present invention is not limited to a vehicle or any other particular type of selectively movable assembly.

Particularly, such an electromechanical braking assembly typically includes a rotor which moves with the wheel of the vehicle or other selectively movable assembly in which the electromechanical braking assembly is operatively disposed and a pad which is made to engage the rotor, by the selectively activated motor, effective to brake the moving wheel and thereby brake the selectively movable assembly.

Importantly, such an electromechanical braking assembly does provide some advantages over traditional hydraulic brake systems. One non-limiting example of such an electromechanical brake assembly is described within European Patent Number EP 0953785A3 which is fully and completely incorporated herein by reference, word for word and paragraph for paragraph.

By way of example and without limitation, such an electromechanical braking system provides the desired braking in a substantially shorter amount of time than that which is provided by a conventional hydraulic braking system and allows each of the individual wheels of a vehicle or other selectively movable assembly to be selectively controlled, thereby enhancing the effectiveness of many operating strategies such as an anti-skid or anti-lock braking strategy or a strategy which is commonly referred to as an integrated vehicular dynamic strategy.

However, while such an electromechanical braking system provides these and other advantages, it requires a relatively large motor which increases the overall cost of producing the vehicle (or other selectively movable assembly) while concomitantly and undesirably requiring a relatively large packaging space which may require a modification in the packaging design of many assemblies, such as vehicle assemblies, which have respectfully and relatively "tight" space constraints or requirements. Further, the relatively large motor requires a relatively large amount of electrical power in order to operate, thereby requiring a relatively large battery or power source, in excess of that which is conventionally placed within a vehicle, thereby further and undesirably increasing the overall production cost of the vehicle or other selectively movable assembly.

Further, current electromechanical brake systems utilize only a single motor and this architecture may be undesirable since these systems may not provide a desired amount of braking in the event that the single provided motor is not activated. In contrast to the single motor electromechanical braking system, an electro-hydraulic braking system normally utilizes a manual second or back up braking assembly which brakes the vehicle or other selectively movable assembly in the event of that desired braking is not provided by the primary electro-hydraulic braking assembly. Although this approach does provide the desired redundancy, it undesirably increases the cost of producing the vehicle, undesirably increases the amount of required packaging space, and, as earlier delineated, does not provide all of the features and benefits associated with an electromechanical braking system.

One attempt to overcome these drawbacks requires the use of a self-energization member, having at least one or more substantially identical wedges which are deployed upon or provided by a single wedge member, and which is typically deployed within the electromechanical braking system. Particularly, the at least one wedge (as well as the other wedges) has a fixed angle of inclination that provides additional mechanical advantage and assists in "forcing" the brake pad against the rotor, thereby reducing the amount of braking actuation power which must be provided by the motor. Importantly, it is the shape or geometric configuration of the at least one wedge which assists the motor in braking the assembly, thereby conserving energy (e.g., the physical or mechanical properties of the at least one wedge provide this desired brake enhancing functionality without requiring additional activation energy or power from the motor). Hence, a member which "provides" such a wedge is referred to as a self-energization member. While this approach does reduce the overall power requirements and the size of the motor, it too has several drawbacks.

For example and without limitation, a conventional electromechanical self-energizing braking system provides a fixed amount of self-energization (an amount which is not selectively variable by a controlled amount and which is wholly determined by the fixed angle of inclination of the at least one wedge as the selectively movable assembly moves in a certain direction), even though the amount of friction between the rotor and the pad varies with temperature, humidity, and other environmental conditions. Therefore, this arrangement requires the operator of the selective moving assembly to vary the amount of pressure or force which is exerted on the braking member in order to achieve the same amount of braking as these environmental conditions change during the operation of the selectively movable assembly, thereby undesirably causing the operator to have an inconsistent braking "feel". Further, this approach does not allow for the use of a relatively low powered motor since the motor must be capable of operating under conditions in which the amount of friction between the rotor and the pad is relatively high and when the amount of friction between the rotor and the pad is relatively low. The inability of the motor to operate under these extreme frictional conditions might cause the brake assembly to undesirably enter a tension mode (e.g., a mode in which the motor must overcome the friction force which is pulling the pad in the same direction as the rotor is moving in order to reduce braking force) from a desired compression mode (e.g., a mode in which the motor pushes the pad in the same direction as the rotor is moving in order to generate a brake force).

That is, during a compression mode of operation which occurs when the frictional force is relatively low, an undersized motor (e.g., a motor which does not provide enough actuation force to ensure desired operation in high and low friction conditions) may not be capable of generating the deceleration desired by the operator. During a tension mode of operation, which occurs when the frictional force is relatively high, an undersized motor may not be able to pull the pad with enough force to prevent it from being frictionally "locked" onto the rotor, thereby preventing the braking assembly from providing the desired braking required by the operator.

Further, while the current electromechanical braking configuration, in the desired compression mode, provides a high gain at one level of friction (e.g., during high friction), it will provide a much lower gain at lower friction levels. This means that a larger actuating motor must be utilized than would be necessary if the wedge angle or the angle of inclination could be optimized (i.e., dynamically configured to provide large amounts of brake enhancement at each friction level). Hence, due to the use of a fixed amount of self-energization (emanating from the use of a fixed angle of inclination), a relatively large motor must be employed to ensure that the braking assembly functions during worst case situations in which a large amount of activation power is required.

Moreover, yet additional drawbacks exist if a single and relatively small motor were utilized in a conventional electromechanical braking system which is designed to operate in both the compression mode and the tension mode. That is, the relatively small motor must overcome the inertia associated with existing compression braking in order to provide tension type braking, thereby resulting in a relatively slow response time which provides an uncomfortable feel to the operator of the selectively movable assembly. Moreover, the braking assembly, in overcoming such inertia, may even provide an undesirable amount of compression or tension type force. In fact, at one instant of time, during this transition, the motor neither provides compression nor tension and at this zero point, the braking assembly may not function in a desired manner.

The present invention overcomes these drawbacks in a new and novel fashion by allowing for a controllably varying amount of self-energization to occur as the amount of friction between the rotor and the pad varies.

SUMMARY OF INVENTION

It is a first non-limiting advantage of the present invention to provide a braking assembly which overcome some or all of the previously delineated disadvantages of prior braking assemblies.

It is a second non-limiting advantage of the present invention to provide a method for braking a selectively movable assembly which overcomes some or all of the drawbacks associated with prior braking methods.

It is a third non-limiting advantage of the present invention to provide an electromechanical braking assembly having a controllably varying amount of self-energizationIt is a fourth non-limiting advantage of the present invention to provide a brake assembly including a pair of selectively movable members each having a respectively unique angle of inclination; and a controller assembly which selectively causes the pair of selectively movable members to cooperatively provide a controllably varying amount of self energization.

It is a fifth non-limiting advantage of the present invention to provide a brake assembly comprising a brake pad; a selectively movable rotor; a backing plate which is coupled to the brake pad; at least a first roller which is coupled to the backing plate; a caliper; at least a second roller which is coupled to the caliper; a wedge member which is positioned between and which engages the at least first and the at least second roller; and a motor which is coupled to the wedge member and which selectively moves the wedge member, effective to brake a selectively movable assembly.

It is a sixth non-limiting advantage of the present invention to provide a method for braking a vehicle of the type having at least one selectively movable wheel. Particularly, the method includes the steps of providing a rotor; coupling the rotor to the at least one wheel; providing a backing plate; providing at least one brake pad; coupling the at least one brake pad to the braking plate; providing a first wedge; coupling the first wedge to the brake pad; providing a second wedge; movably coupling the second wedge to the first wedge; providing a first and a second motor; coupling the first motor to the first wedge; coupling the second motor to the second wedge; causing the first motor to move the first wedge against the second wedge and against the brake pad, effective to cause the brake pad to frictionally engage the rotor, thereby braking the vehicle.

These and other features and advantages of the present invention will become apparent from a reading of the following detailed description of the preferred embodiment of the invention and by reference to the following drawings.

DETAILED DESCRIPTION

Figure 1:
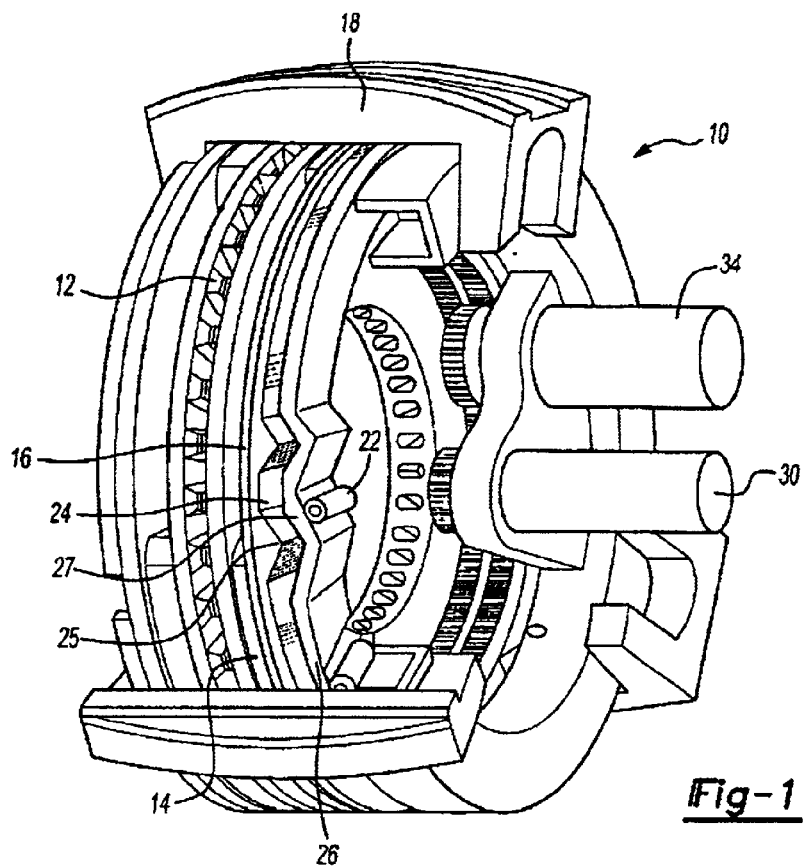
FIG. 1 is a perspective and partially cut away view of an electromechanical braking assembly which is made in accordance with the teachings of the preferred embodiment of the invention.
Figure 2:
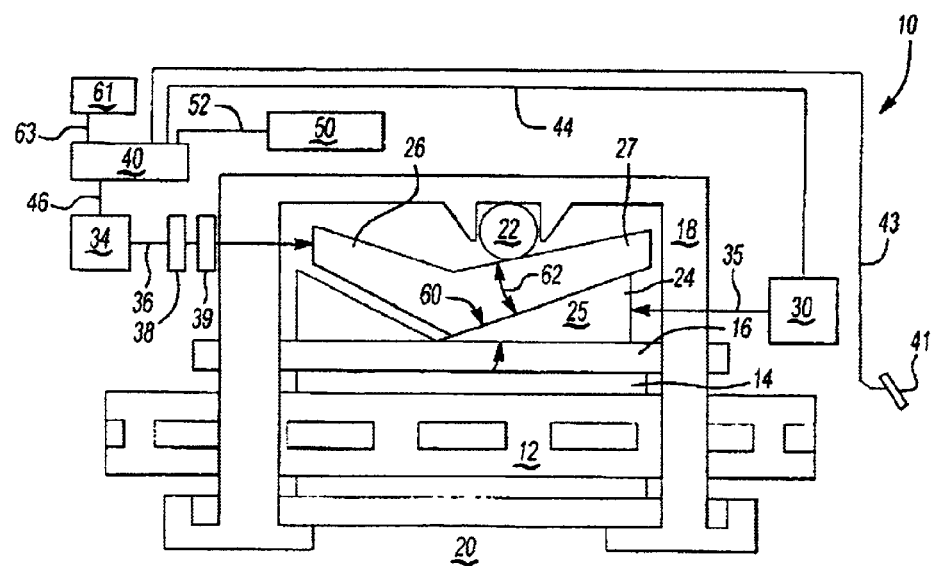
FIG. 2 is a block diagram of the electromechanical braking assembly which is shown in FIG. 1.

Referring now to FIGS. 1 and 2, there is shown an electromechanical brake assembly 10 which is made in accordance with the teachings of the preferred embodiment of the invention.

Particularly, the electromechanical brake assembly 10 includes at least one rotor 12 which is attached to and which selectively rotates with a wheel (not shown) of the selectively movable assembly or vehicle (not shown) into which the brake assembly 10 is operatively disposed within. Further, as shown, the electromechanical brake assembly 10 includes at least one pad member 14 which may selectively engage the movable rotor 12 in a manner which is more fully delineated below and which is effective to brake the selectively movable assembly which operatively contains the electromechanical brake assembly 10. It should be appreciated that multiple pad members 14 may be used within the brake assembly 10 and that a selectively movable assembly, such as a vehicle, may have one brake assembly 10 operatively disposed on each selectively movable vehicular wheel.

Further, the electromechanical brake assembly 10 includes a backing plate 16 which is physically connected or coupled to the pad member 14, a caliper assembly 18 which is coupled to the body or frame 20 of the selectively movable assembly which operatively contains assembly 10, a member 22, such as a pin, bearing, dowel or slide, which is physically connected or coupled to the caliper 18 (e.g., by use of a welded or other conventional connection), a first self energization member or wedge member 24 having at least one wedge or wedge portion 25 and which is physically connected or coupled to the backing plate 16, a second self energization member or wedge member 26 which has at least one wedge or wedge portion 27 which is selectively and engagably received by the first wedge portion 25, a first motor 30 which includes an output shaft 35 which selectively engages the first wedge member 24, a second motor 34 having an output shaft 36 which selectively engages the second wedge member 26, a computer controller 40 which is operable under stored program control and which is physically, communicatively, and controllably coupled to the first and second motors 30, 34 by the use of respective busses 44, 46, and a source of electrical power 50 (e.g., a vehicular battery) which is physically coupled to the controller 40 by the use of bus 52. In the preferred embodiment of the invention, caliper 18 covers approximately a sixty to ninety degree area of the rotor 12, (i.e., the caliper 18 circumscribes an angle of approximately 60 to 90 degrees of the rotor 12). However, it should be understood to one who is skilled in the relevant art that caliper 18 may be substantially any desired configuration or cover substantially any desired angular portion of rotor 12.

The braking assembly 10 further includes an accelerometer 61 which is physically and communicatively coupled to the controller 40 by use of the bus 63. The controller 40 is further communicatively coupled to a selectively depressible brake member or pedal 41 by the use of bus 43. The controller 40 and motors 30, 34 may comprise a "controller assembly" and, in one non-limiting embodiment, motors 30, 34 are substantially identical.

In operation, the brake member 41 is depressed by an operator of the selectively movable assembly when the operator desires to decelerate or brake the selectively movable assembly. Upon the detection of the depression of the brake member 41, the controller 40 determines that a certain amount of braking is desired. That is, in one non-limiting embodiment, a calibrated table having several brake member positions and respective amounts of braking are stored within the controller 40. A braking value is selected by use of the table (e.g., the braking value of the stored brake position which is closest to the currently sensed position is selected from the stored table). The controller 40 then activates the motor 30, thereby causing the shaft 35 to engage wedge member 24, effective to force the at least one wedge portion 25 against the at least one wedge portion 27 of the member 26 and this forces the at least one wedge member 26 against frame mounted caliper 18 through member 22 and causes a braking force to be executed on the brake pad 14 by the member 24, effective to initially supply a certain and relatively small amount of braking to the selectively movable assembly which operatively contains assembly 10.

The accelerometer 61 then senses the rate of deceleration of the selectively movable assembly that the brake assembly 10 is operatively disposed within and uses this sensed rate of deceleration to determine the amount of friction which is present or which currently exists between the brake pad 14 and the rotor 12. This determination is achieved in the manner which is more fully discussed below.

Particularly, as shown, the at least one wedge portion 27 of member 26 has an angle of inclination 62 while the at least one wedge portion 25 of member 24 has an angle of inclination 60. Once the member 24 is initially moved in response to the initial sensing of the depression of member 41, a wedge or self energization angle α may be calculated by use of the following equation:

$$\text{Tan}(\alpha) = \frac{(\text{input force})\mu}{(\text{output force})} + \mu \qquad \text{(Equation 1)}$$

where: $\mu$=coefficient of friction between the brake pad 14 and the rotor 12; output force=frictional force acting on the rotor 12; and input force=force provided by motor 30 acting on the wedge member 24 which may be sensed (e.g., by use of a force sensor which is coupled to the motor 30) or easily measured by the controller 40.

The output force may be calculated by the controller 40 as a front output force and a rear output force as follows: output force (front)=0.5*F×b×Rt/Rc (Equation 2) output force (rear)=0.5*F×(1−b)×Rt/Rc (Equation 3) where: F=the decelerative force which is measured by the accelerometer 61; Rt is the radius of the tire which is attached to the wheel upon which brake assembly 10 is operatively disposed (not shown) and which may be easily measured; "Rc" is the effective radius of the caliper 18 which may be easily measured; and b is the percentage of total braking force which is supplied by the front tires and which may be measured or sensed by the controller 40. Hence, by knowing the initial angle α, which may be determined by the controller 40 by identifying the wedge member which is initially moved (e.g., the variable α is equal to the value of angle 60 when wedge 24 is moved), the value of $\mu$ may be easily determined by the controller 40. Thus, the amount of friction between the brake pad 14 and rotor 12 may then be ascertained by the controller 40.

Particularly, in high friction conditions, the second motor 34 is not activated and the wedge member 26 is substantially stationary. The first motor 30 continues to be activated by the controller 40, effective to cause the output shaft 35 to move the wedge member 24 and causing the wedge portion 25 of member 24 to engage the member 26 (to engage portion 27), thereby providing self energization since the angle 60 of the wedge portion 25 of the wedge member 24 causes or forces the wedge portion 27 of the wedge member 26 to engage member 22 and causes member 24 to provide force onto the brake pad 14. It should be realized that the first motor 30 is activated upon receipt of electrical power which is sourced from the power supply 50 and communicated to the first motor 30 by the use of busses 52, and 44. Alternatively, motors 30, 34 may both be activated in order to actuate the wedge members 24, 26 in opposite directions, thereby providing both force upon the brake pad 14 and self energization in substantially high friction environments.

In relatively low friction environments (associated with a certain rate of deceleration) which are sensed by the controller 40 in the foregoing manner or conditions, both of the motors 30 and 34 are activated, thereby causing the output shafts 35 and 36 to move wedge members 24, 26 in substantially the same direction, thereby providing an overall lower angle of inclination (e.g., the effective angle of inclination is relatively small and is equal to the difference between angle 60 and 62).

In the forgoing manner, the electromechanical brake assembly 10 provides a controllably varying amount of self energization effective to allow the brake assembly 10 to always provide a substantially large amount of self energization even under varying environmental conditions. Thus motors 30, 34 may each be relatively small and cooperatively provide a redundant braking architecture, since the braking assembly 10 may operate with only one of the motors 30, 34. In one non-limiting embodiment, the foregoing frictional measurements and calculations may be periodically accomplished by the controller 40 as the brake assembly 10 is being operated and, based upon these calculations, the controller 40 may dynamically control motors 30, 34 to dynamically vary the amount of provided self energization in a controlled manner.

In yet another non-limiting embodiment of the invention, an intermediate gear assembly, such as gear assembly 38, may be coupled to either/both of the output shafts 35, 36, and a screw actuator assembly, such as screw actuator assembly 39, is coupled to each assembly 38. As shown in FIG. 2, a pair of assemblies 38, 39 cooperatively transfers energy from a shaft 35, 36 to a member 24, 26. It should be understood that many different actuation means or devices may be employed to actuate the wedge members 24, 26 and that nothing in this description is meant to limit the present assembly 10 to include the assemblies 38, 39.

Figure 3:
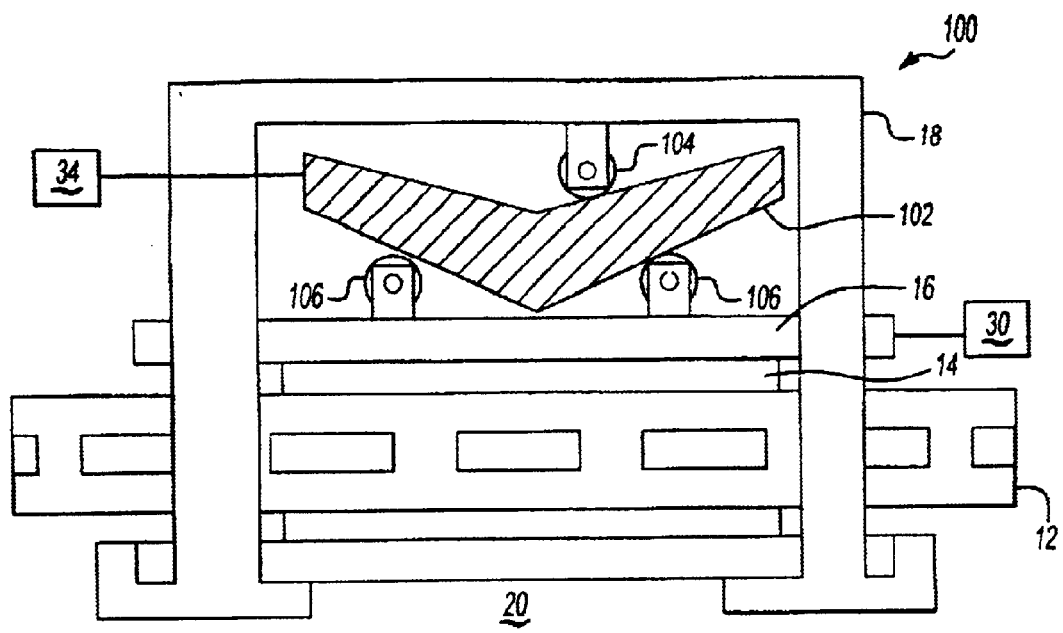
FIG. 3 is a block diagram of an electromechanical braking assembly which is made in accordance with the teachings of an alternate embodiment of the invention.

Referring now to FIG. 3, there is shown a brake assembly 100 which is made in accordance with the teachings of a first alternate embodiment of the invention. Particularly, brake assembly 100 differs from brake assembly 10 in that wedge members 24 and 26 are replaced by a single "V"-shaped wedge 102, the member 22 is replaced with a roller member 104 contacting the upper surface of wedge 102, and two substantially identical roller members 106 are attached to the backing plate 16 and protrude from the baking plate 16 in a direction toward the wedge member 102 to contact the lower surface of wedge 102. As shown in FIG. 3, the upper and lower surfaces of wedge 102 are at different angles and the movement of the pad 14, backing plate 16, and roller 106 by motor 30 selectively forces brake pad 14 against the rotor 12. That is, the bottom wedge angle of wedge member 102 is utilized by motor 30 to provide self energization in relatively high friction environments. In relatively low friction environments, motors 34, 30 may both be activated to actuate both the wedge member 102 (i.e., by use of motor 34) and the backing plate 16 (i.e., by use of motor 30) in order to move the wedge member 102 in substantially the same direction as the backing plate 16. Alternatively, in substantially high friction environments, motors 30, 34 may be activated in order to actuate the wedge member 102 in a substantially opposite direction as the backing plate 16. It should be understood that in this first alternate embodiment of the invention, the backing plate 16 is actuated in substantially the same manner as the wedge member 24 of the preferred embodiment.

The use of rollers 104 and 106 reduces friction by eliminating and/or reducing the amount of friction which typically occurs between the member 22 and the wedge member 24 and by eliminating and/or reducing the amount of friction which occurs between the wedges members 24, 26. Such reduced friction allows the motors 30, 34 to be even smaller than those used in the embodiment which is shown and described with respect to FIGS. 1 and 2. In one non-limiting embodiment, roller member 104 may be substantially identical to roller member 106.

Figure 4:
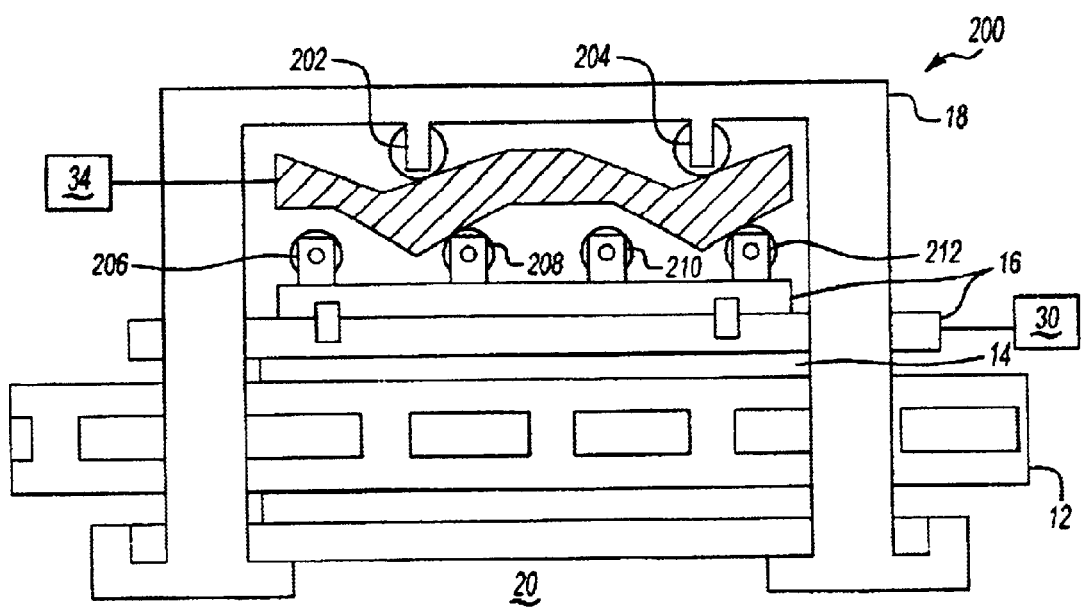
FIG. 4 is a block diagram of an electromechanical braking assembly which is made in accordance with the teachings of a second alternate embodiment of the invention.

Referring now to FIG. 4, there is shown a brake assembly 200 which is made in accordance with the teachings of yet another embodiment of the invention and which differs from the brake assembly 100 in that two rollers 202, 204 are used instead of the single roller 104 and four rollers 206, 208, 210, and 212 are used instead of the rollers 106. The use of these rollers 206–212 not only reduces friction but ensures that the pad 14 remains substantially parallel to the rotor 12, thereby eliminating taper wear.

It is to be understood that the invention is not limited to the exact construction which has been delineated above, but that various changes and modifications may be made without departing from the spirit and the scope of the inventions as they are delineated in the following claims.

What is claimed is:

1. A brake assembly including a pair of selectively movable members each having a respectively unique angle of inclination; and a controller assembly which is coupled to said pair of selectively movable members and which selectively causes said pair of selectively movable members to cooperatively provide a controllably varying amount of self energization, wherein said controller assembly comprises a controller which is operable under stored program control; a first motor which selectively moves said first of said pair of members and which is coupled to said controller; and a second motor which selectively moves said second of said pair of members and which is coupled to said controller.

2. The brake assembly of claim 1 further comprising an accelerometer which is coupled to said controller assembly and which generates a certain signal which is transmitted to said controller assembly and which causes said controller assembly to move at least one of said pair of selectively movable members by a certain amount.

3. The brake assembly of claim 2 wherein each of said selectively movable members has at least one wedge portion.

4. The brake assembly of claim 3 wherein said wedge portion of a first of said pair of selectively movable members is dissimilar from said wedge portion of a second of said pair of selectively movable members.

5. The brake assembly of claim 1 wherein said first and second motors are substantially identical.

6. The brake assembly of claim 5 wherein said wedge portion of said first member frictionally and slidably engages said wedge portion of said second member.

7. The brake assembly of claim 6 further comprising a pad which is coupled to said first member.

8. A method for braking a vehicle of the type having at least one selectively movable wheel, said method comprising the steps of providing a rotor; coupling said rotor to said at least one wheel; providing a backing plate; providing at least one brake pad; coupling said at least one brake pad to said backing plate; providing a first wedge; coupling said first wedge to said backing plate; providing a second wedge; movably coupling said second wedge to said first wedge; providing a first and a second motor coupling said first motor to said first wedge; coupling said second motor to said second wedge; causing said first motor to move said first wedge against said second wedge and against said brake pad, effective to cause said at least one brake pad to frictionally engage said rotor, thereby braking said vehicle.

9. The method of claim 8 further comprising the steps of causing said first and second motors to be substantially identical.

10. The method of claim 8 wherein said first and said second wedges are dissimilar.

11. The method of claim 8 further comprising the steps of:
providing a selectively depressible braking member;
providing a controller;
coupling said controller to said first and said second motors; and
coupling said selectively movable braking member to said controller.

12. The method of claim 8 further comprising the step of activating said first motor only when said controller senses a depression of said selectively depressible braking member, effective to cause said first wedge to frictionally engage said second wedge, thereby braking said vehicle.

13. The method of claim 12 further comprising the step of sensing a rate of deceleration of said vehicle and communicating said rate of deceleration to said controller.

14. The method of claim 13 further comprising the step of activating said second motor only when said controller senses a depression of said braking member and only when said sensed rate of deceleration is of a certain value.

* * * * *